(12) United States Patent
Ko et al.

(10) Patent No.: US 8,613,561 B2
(45) Date of Patent: Dec. 24, 2013

(54) OPTICAL UNIVERSAL SERIAL BUS (USB)

(71) Applicants: Jamyuen Ko, San Jose, CA (US); Hengju Cheng, Mountain View, CA (US); Tom Mader, Los Gatos, CA (US)

(72) Inventors: Jamyuen Ko, San Jose, CA (US); Hengju Cheng, Mountain View, CA (US); Tom Mader, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/758,271

(22) Filed: Feb. 4, 2013

(65) Prior Publication Data

US 2013/0148930 A1   Jun. 13, 2013

Related U.S. Application Data

(63) Continuation of application No. 11/731,810, filed on Mar. 30, 2007, now Pat. No. 8,398,314.

(51) Int. Cl.
*G02B 6/36* (2006.01)
*G02B 6/38* (2006.01)

(52) U.S. Cl.
USPC ............... 385/93; 385/53; 385/73; 385/74; 385/88; 385/92

(58) Field of Classification Search
None
See application file for complete search history.

(56) References Cited

U.S. PATENT DOCUMENTS

| | | | |
|---|---|---|---|
| 4,781,431 A * | 11/1988 | Wesson et al. | 385/79 |
| 5,109,452 A * | 4/1992 | Selvin et al. | 385/69 |
| 5,241,612 A * | 8/1993 | Iwama | 385/74 |
| 5,242,315 A * | 9/1993 | O'Dea | 439/577 |
| 6,584,519 B1 * | 6/2003 | Russell | 710/62 |
| 6,739,766 B2 * | 5/2004 | Xu et al. | 385/93 |
| 6,755,575 B2 * | 6/2004 | Kronlund et al. | 385/73 |
| 6,964,578 B2 * | 11/2005 | Clark et al. | 439/320 |
| 6,981,887 B1 * | 1/2006 | Mese et al. | 439/244 |
| 7,182,646 B1 * | 2/2007 | Chou et al. | 439/660 |
| 7,347,632 B2 * | 3/2008 | Farr | 385/89 |
| 7,374,349 B2 * | 5/2008 | Wang | 385/92 |
| 7,572,071 B1 * | 8/2009 | Wu | 385/94 |
| 7,717,733 B1 * | 5/2010 | Yi et al. | 439/452 |
| 7,798,726 B2 * | 9/2010 | Sabo | 385/88 |

(Continued)

FOREIGN PATENT DOCUMENTS

| | | |
|---|---|---|
| CN | 87216477 | 8/1998 |
| CN | 2475175 | 1/2002 |

(Continued)

OTHER PUBLICATIONS

PCT Int'l Search Report and Written Opinion for Int'l Appiication No. PCT/US2009/058304 mailed Apr. 30, 2010, 11 pages.

(Continued)

*Primary Examiner* — Rhonda Peace
(74) *Attorney, Agent, or Firm* — Blakely, Sokoloff, Taylor & Zafman LLP

(57) ABSTRACT

Embodiments of the invention are directed to an optical USB (OUSB) to enhance the data rate of USB by adding super-high data rate (e.g. 10 Gbps) optical communication on top of its current specification so that backward compatibility is achievable. Mechanical tolerances may be achieved by using embedded lenses to expand a beam emerging from the connector prior to entering its mating connector and using an identical lens in the mating connector to collimate the beam back onto a fiber.

18 Claims, 3 Drawing Sheets

(56) References Cited

U.S. PATENT DOCUMENTS

| | | | |
|---|---|---|---|
| 7,887,243 B2 | 2/2011 | Abel et al. | |
| 7,896,559 B2* | 3/2011 | Yi et al. | 385/75 |
| 7,985,026 B1* | 7/2011 | Lin et al. | 385/71 |
| 8,251,593 B2* | 8/2012 | Liao et al. | 385/90 |
| 8,262,296 B2* | 9/2012 | Liao et al. | 385/90 |
| 8,398,314 B2* | 3/2013 | Ko et al. | 385/93 |
| 8,403,568 B2* | 3/2013 | Wang et al. | 385/76 |
| 2002/0004336 A1* | 1/2002 | Yamaguchi | 439/577 |
| 2002/0006748 A1* | 1/2002 | Tolmie et al. | 439/608 |
| 2002/0102066 A1 | 8/2002 | Nishita | |
| 2003/0133687 A1 | 7/2003 | Han et al. | |
| 2004/0042735 A1* | 3/2004 | Ma | 385/88 |
| 2004/0184738 A1 | 9/2004 | McColloch et al. | |
| 2005/0180700 A1* | 8/2005 | Farr | 385/89 |
| 2006/0056779 A1 | 3/2006 | Wang | |
| 2006/0263012 A1* | 11/2006 | Yamazaki | 385/88 |
| 2007/0122156 A1* | 5/2007 | Wang et al. | 398/141 |
| 2008/0320200 A1* | 12/2008 | Pederson et al. | 710/305 |
| 2009/0154884 A1 | 6/2009 | Chen et al. | |
| 2009/0274422 A1* | 11/2009 | Henry et al. | 385/92 |
| 2009/0324176 A1* | 12/2009 | Cheng et al. | 385/73 |
| 2010/0046891 A1* | 2/2010 | Sabo | 385/74 |
| 2010/0080519 A1* | 4/2010 | Ko et al. | 385/93 |
| 2010/0104244 A1* | 4/2010 | Grinderslev | 385/74 |
| 2010/0226612 A1* | 9/2010 | Sedio et al. | 385/93 |
| 2010/0278490 A1* | 11/2010 | Liao et al. | 385/90 |
| 2010/0290745 A1* | 11/2010 | Liao et al. | 385/90 |
| 2010/0303420 A1* | 12/2010 | Lin et al. | 385/74 |
| 2011/0085766 A1* | 4/2011 | Liao et al. | 385/71 |
| 2011/0091160 A1* | 4/2011 | He et al. | 385/74 |
| 2011/0091161 A1* | 4/2011 | He et al. | 385/74 |
| 2011/0091162 A1* | 4/2011 | He et al. | 385/75 |
| 2011/0097040 A1* | 4/2011 | Lin et al. | 385/74 |
| 2011/0097041 A1* | 4/2011 | Liao et al. | 385/74 |
| 2011/0097042 A1* | 4/2011 | Liao et al. | 385/74 |
| 2011/0097043 A1* | 4/2011 | He et al. | 385/75 |
| 2011/0142401 A1* | 6/2011 | Lin et al. | 385/77 |
| 2011/0299816 A1* | 12/2011 | Yen et al. | 385/89 |

FOREIGN PATENT DOCUMENTS

| | | |
|---|---|---|
| JP | 64-54406 | 3/1989 |
| JP | 04-340508 | 11/1992 |
| JP | 2001167837 | 6/2001 |
| JP | 2002050978 | 2/2002 |
| JP | 2002117948 | 4/2002 |
| JP | 2002190344 | 7/2002 |
| JP | 2003-107277 | 9/2003 |
| KR | 10-2006-0054914 | 5/2004 |
| KR | 10-2008-0030951 | 4/2008 |
| KR | 20080091414 | 10/2008 |
| TW | M304153 | 1/2007 |
| TW | M341336 | 9/2008 |
| WO | WO-2007033042 | 3/2007 |
| WO | WO-2008121731 | 10/2008 |

OTHER PUBLICATIONS

First Office Action from Japanese Patent Application No. 2009-552939, mailed Aug. 23, 2011, 3 pages.
Notice of Allowance for Korean Patent Application No. 2009-7020350, issued Nov. 29. 2011, 3 pages.
Office Action for Korean Patent Application No. 2009-7020350, mailed Feb. 10, 2011, 4 pages.
Notice of Allowance from GB Patent Application No. GB0915900.5, mailed Apr. 15. 2011, 1 page.
International Search Report and Written Opinion from PCT/US2008/058496 mailed Aug. 18, 2008, 9 pages.
International Preliminary Report on Patentability from PCT/US2008/058496 mailed Oct. 15, 2009, 5 pages.
First Office Action for Chinese Patent Application No. 200810100363.7, mailed Mar. 11, 2010, 5 pages.
Notice of Allowance for Chinese Patent Application No. 200810100363.7, mailed Nov. 15, 2010, 4 pages.
Office Action for Taiwan Patent Application No. 97111354, mailed Aug. 12, 2011, 4 pages.
Office Action from U.S. Appl. No. 11/731,810 mailed Sep. 13, 2011, 10 pages.
Final Office Action for U.S. Appl. No. 12/242,311, mailed Nov. 28, 2011, 12 pages.
Non-Final Office Action for U.S. Appl. No. 12/242,311, mailed Dec. 21, 2010, 9 pages.
Non-Final Office Action for U.S. Appl. No. 12/242,311, mailed May 25, 2011, 10 pages.
International Search Report & Written Opinion for PCT Application No. PCT/US2009/057598, mailed Jun. 11, 2010, 12 pages.
Office Action from Korean Application 10-2011-7007290 mailed Apr. 25, 2012, 9 pages.
International Preliminary Report on Patentability & Written Opinion for PCT Application No. PCT/US2009/057598, mailed Mar. 29, 2012, 8 pages.
Notice of Allowance from U.S. Appl. No. 11/731,810 mailed Apr. 30, 2012, 12 pages.
International Search Report and Written Opinion from PCT/US2011/052657 mailed Apr. 26, 2012, 12 pages.
International Preliminar Report on Patentability, from PCT/US2009/058304 mailed Apr. 14, 2011, 6 pages.
Office Action from U.S. Appl. No. 12/242,311 mailed Mar. 20, 2012, 14 pages.
Office Action from Taiwanese (R.O.C). Application No. 98132907 mailed Jul. 25, 2012, 5 pages.
Final Office Action from Korean Application No. 10-2011-7007290 mailed Aug. 13, 2012, 2 pages.
Office Action from Korean Application No. 10-2011-7007290 mailed Sep. 28, 2012, 4 pages.
Final Office Action for U.S. Appl. No. 12/242,311, mailed Oct. 2, 2012, 16 pages.
Notice of Allowance from U.S. Appl. No. 11/731,810 mailed Nov. 2, 2012, 10 pages.
Restriction Requirement from U.S. Appl. No. 12/887,325 mailed Nov. 14, 2012, 7 pages.
Office Action from U.S. Appl. No. 12/887,325 mailed Jan. 8, 2013, 12 pages.
Office Action from Chinese Application No. 200980137745.X mailed Feb. 5, 2013, 5 pages.

* cited by examiner

OPTICAL UNIVERSAL SERIAL BUS (USB)

PRIORITY

This application is a Continuation of and claims priority to U.S. patent application Ser. No. 11/731,810 filed Mar. 30, 2007.

FIELD OF THE INVENTION

Embodiments of the invention relate to the universal serial bus and, more particularly, to a USB including having optical capabilities.

BACKGROUND INFORMATION

In many of today's processing systems, such as personal computer (PC) systems, there exist universal serial bus (USB) ports for connecting various USB devices. Some of these USB devices are frequently used by PC users. For example, these USB devices may be printers, compact disk read-only-memory (CD-ROM) drives, CD-ROM Writer (CDRW) drives, digital versatile disk (DVD) drives, cameras, pointing devices (e.g., computer mouse), keyboards, joy-sticks, hard-drives, speakers, etc. Some of these devices use more of the available USB bandwidth than others. For example, a USB CDRW is a high bandwidth device, while human interface devices (HID), such as computer mice, keyboards and joysticks, are low bandwidth devices.

Within a USB cable there are typically four shielded wires. Two of the wires may provide power (+5 volts (red) and ground (brown)) and a twisted pair (blue and yellow) for data.

At either end of a USB cable there is a standard sized connector. These connectors each has a different profile designated "A" connectors and "B" connectors. More recently, mini versions of these connectors are appearing to accommodate smaller devices. "A" connectors head "upstream" toward the computer. On the other end, "B" connectors head "downstream" and connect to individual devices. This way, it is almost fool proof to make a wrong connection.

The USB standard allows for low power devices (e.g., mice, memory sticks, keyboards, etc.) to draw their power from their USB connection. Larger devices requiring more power, such as scanners or printers, typically have their own dedicated power supply.

FIG. 1 shows a typical USB "A" male connector 10. The cable 12, comprises the above mentioned four wires and connects to a plastic housing 14. Each of the four wires electrically connects within the housing 14 to one of four contact terminals or pins 16 mounted on the top side of an insulative base 18. The insulative base 18 is wrapped in a metal shield 19. Openings 20 in the metal shield may be provided to lock the connector in place when plugged into a corresponding female connector.

FIG. 2 shows a more detailed view of the insulative base 18. As shown, conductive fasteners 21, 22, 23, and 24 are provided at one end to connect to each of the four wires in the cable 12. The outer two fasteners 21 and 22, are for power and the inner two connectors 23 and 24 are for data. On a top side of the insulative base 18 are four pins 31, 32, 33, and 34, corresponding to the contacts 21, 22, 23, and 24, respectively. The pins 31-34 within the male connector 10 electrically engage to mating pins within the female connector when plugged in.

Different standards of USB technology have different bandwidths. For instance, Universal Serial Bus Specification, revision 1.1, Sep. 23, 1998 (USB 1.1) devices are capable of operating at 12 Mbits/second (Mbps). Universal Serial Bus Specification, revision 2.0, Apr. 27, 2000 (USB 2.0; also known as high-speed USB) devices are capable of operating at 480 Mbps. However, as technology progresses engineers are constantly striving to increase operating speeds.

DETAILED DESCRIPTION

Embodiments of the invention are directed to an optical USB (called OUSB hereafter) to enhance the data rate of USB by adding super-high data rate (e.g. 10 Gbps) optical communication on top of its current specification so that backward compatibility is achievable.

A challenge with OUSB is the need to be backward compatible with the legacy USB form factor, which requires relatively large mechanical tolerances. That is, the mechanical tolerance specified by the USB connector is 0.3 mm. Optical connectors typically use a butt contact approach. However, optical butt contact may require 10 um precision or better. This makes the usual optical connector an unviable solution for USB form factor.

In order to resolve this issue, embodiments disclose an optical beam expanding approach. By expanding the beam size to, for example, 1 mm, the 0.3 mm mechanical tolerance required by the USB connector may be achieved.

Figure 2:
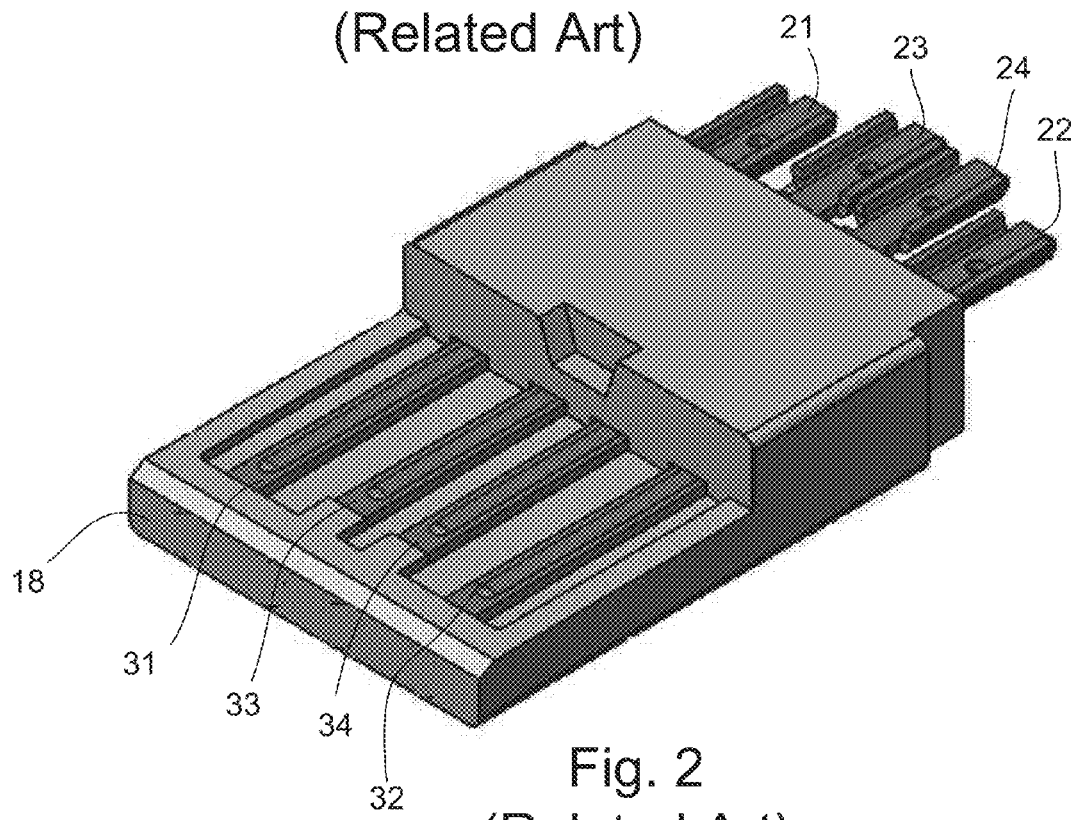
FIG. 2 is a block diagram showing a more detailed view of the insulative base of a USB "A" male connector.
Figure 3:
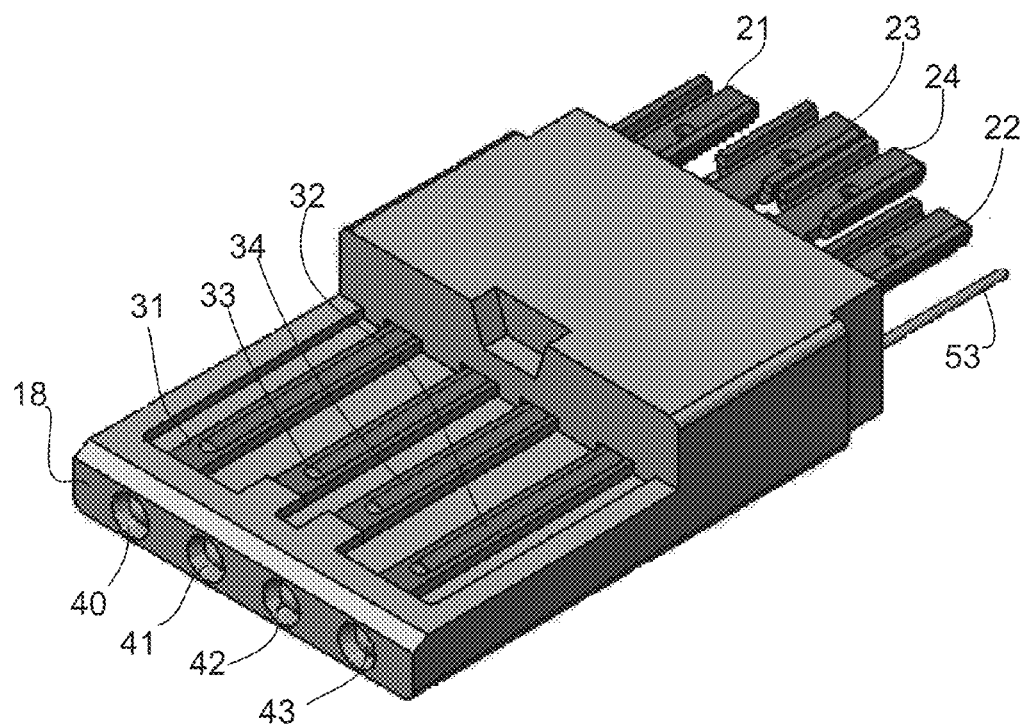
FIG. 3 is a top view of an insulative base of a USB "A" male connector according to embodiments of the invention.
Figure 4:
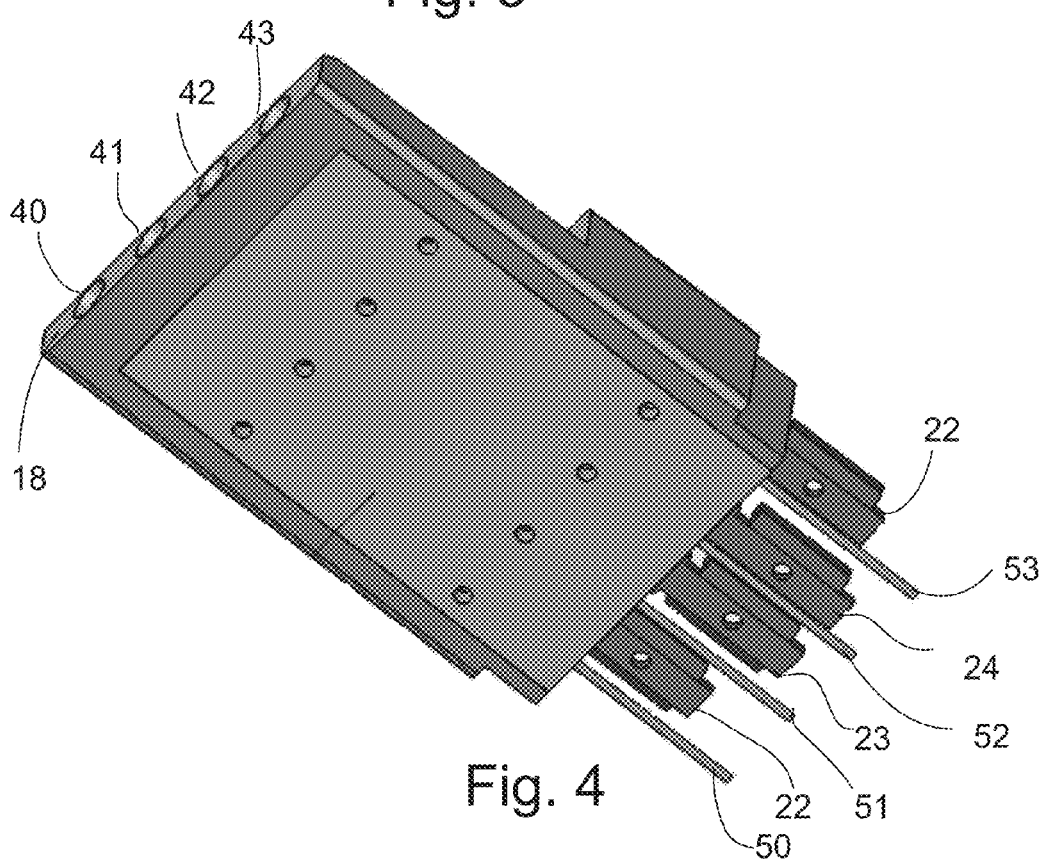
FIG. 4 is a bottom view of an insulative base of a USB "A" male connector according to embodiments of the invention.

Referring now to FIGS. 3 and 4, there is shown a top view and a bottom view, respectively, of the insulative base 18 of an OUSB connector according to one embodiment of the invention. Similar to that which is shown and described in FIG. 2, conductive fasteners 21, 22, 23, and 24 are provided at one end to connect to each of the four wires in the cable 12. The outer two fasteners 21 and 22, are for power and the inner two connectors 23 and 24 are for data. On a top side of the insulative base 18 are four pins 31, 32, 33, and 34, corresponding to the contacts 21, 22, 23, and 24, respectively. The pins 31-34 within the male connector 10 electrically engage to mating pins within the female connector when plugged in.

Figure 1:
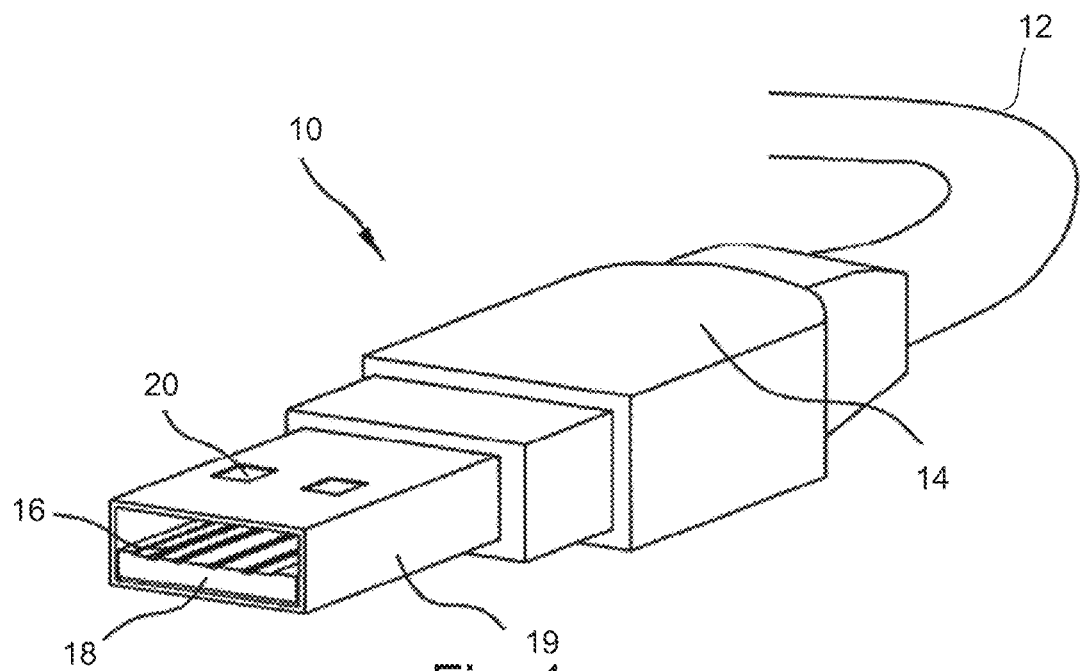
FIG. 1 is a block diagram showing a typical USB "A" male connector.

In addition, the OUSB connector comprises embedded lenses 40, 41, 42, and 43 on the leading edge of the insulative base 18. These lenses are optically coupled to respective fibers 50, 51, 52, and 53 for providing high speed optical data throughput. While four lenses are shown, this is by way of example and more or fewer may be provided. The lenses 40-43 may be within tapered holes as shown for fiber self-alignment in installation. The tapered holes may have metal inserts for added rigidity. While not shown in FIGS. 3 and 4, the insulative base 18 would be contained in a plastic housing 14 and include a metal shield 19 as shown in FIG. 1.

Figure 5:
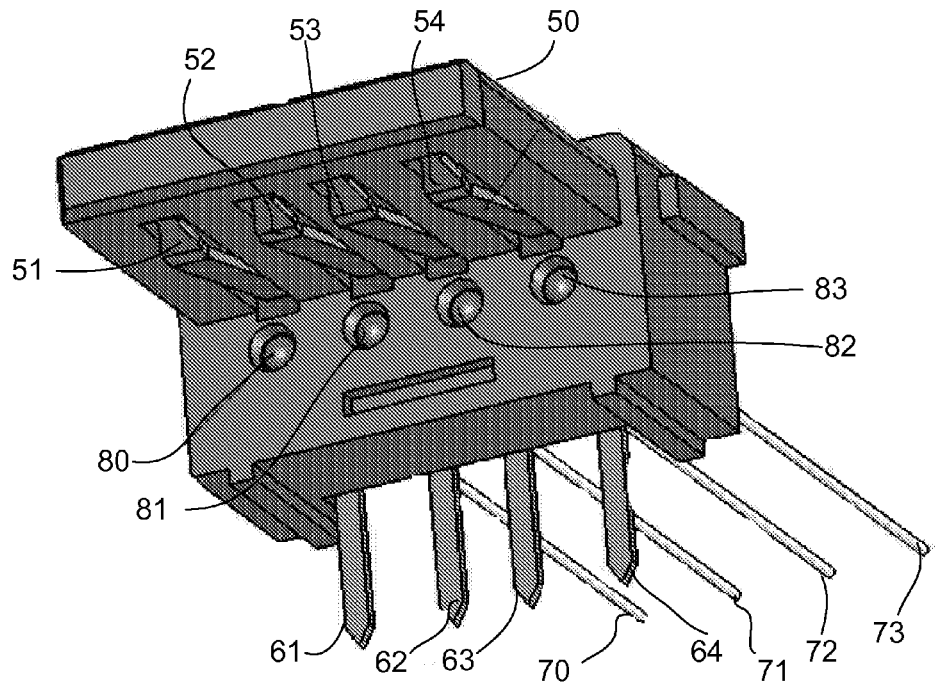
FIG. 5 is a block diagram of a female USB "A" connector according to embodiments of the invention.

FIG. 5 shows the inside of an "A" connector female OUSB configured to mate with the connector shown in FIGS. 3 and 4. As in standard USB, an insulative carrier 50 may comprise four contacts 51, 52, 53, and 54, which may be spring loaded, adapted to make electrical connection with pins 31, 32, 33, and 34, respectively, in the male connector. The four contacts 51, 52, 53, and 54 may be in turn electrically connected to a USB device with contact posts 61, 62, 63, and 64. Four fibers 70, 71, 72, and 73 may enter the female connector and be optically coupled to four embedded lenses 80, 81, 82, and 83, which, when connected, optically couple to the corresponding lenses 40-43 in the male connector.

Figure 6:
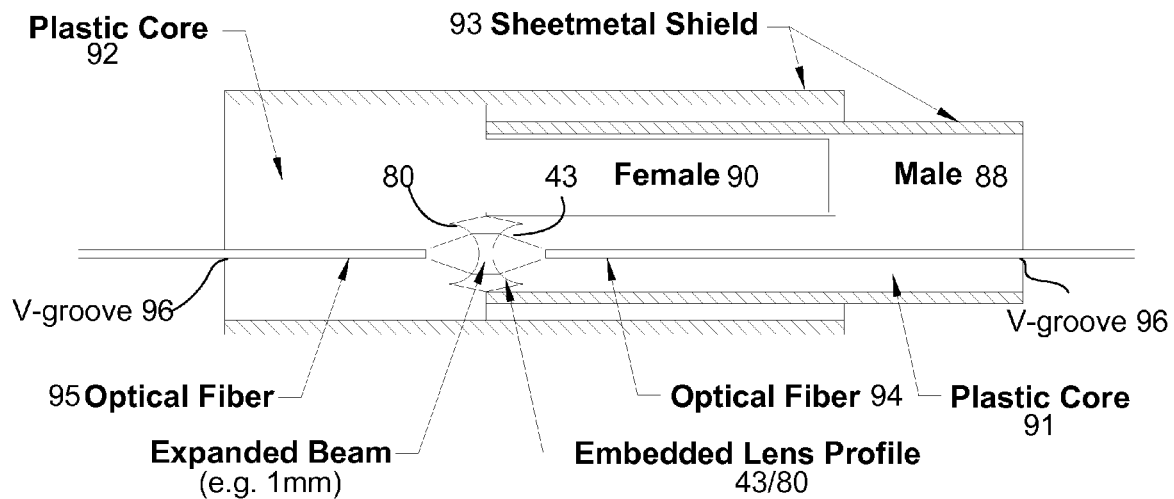
FIG. 6 is a cross sectional view of a mated USB "A" connector according to embodiments of the invention.

FIG. 6 shows a cut-away side view of a male OUSB connector 88 and female OUSB connector 90 when mated. For simplicity, the electrical connections are not shown in this figure, but may be present as shown in FIGS. 3-5. The male OUSB connector 88 comprises a plastic base or core 91. The female OUSB connecter also comprises a plastic core 92 each surrounded by its own metal shield 93. The plastic cores 91 and 92 may include V-grooves 96 to facilitate alignment of optical fibers 94 and 95.

After the plug (male) 90 and receptacle (female) 88 are mated, the lenses 43 and 80 are used to expanded the optical beam to facilitate optical communication. As illustrated, the optical beam from the fiber 94 from the male side may be expanded by lens 43 to, for example, approximately 1 mm. The expanded beam may then be collimated by the embedded lens 80 at the female side couple with fiber 95. Since the embedded lens profile 43 and 80 is identical at both sides, optical signals can go either direction. As one can see, expansion of the beam makes it possible to optically couple the fibers 94 and 95 since traditional butt coupling does not work well within the mechanical tolerance confines of USB connectors.

While the above embodiments have been illustrated as USB "A" connectors one skilled in the art will readily recognize that the invention described herein is equally applicable to USB "B" connectors or other USB form factors.

There are many advantages to OUSB. In particular, embodiments maintain all traditional USB electrical connections within the existing USB form factor. Thus, it is fully backward compatibility with the USB 2.0 specification. It allow super-high speed data rate (i.e. 10 Gbps) compared to the high speed of USB 2.0 (480 Mbps). In addition, optical signal integrity may be maintained in high EMI environments such as factories where traditional electrical connections may experience issues.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A universal serial bus (USB) connector, comprising:
   an insulative base having a first surface and a second surface different from the first surface;
   a plurality of pins on the first surface of the insulative base to make electrical connections with a mating USB connector, including pins to provide power, ground, and at least two data lines for an electrical data connection; and
   multiple lenses embedded in the second surface of the insulative base to convey an optical data signal beam with the mating USB connector, including expanding a beam from an optical fiber optically coupled to a lens for transmission to the mating USB connector, and collimating and focusing a beam into an optical fiber optically coupled to a lens for reception from the mating USB connector.

2. The USB connector as recited in claim 1 wherein at least one of the multiple lenses expands the beam to approximately 1 mm.

3. The USB connector as recited in claim 1 wherein the multiple lenses comprise four embedded lenses each respectively optically coupled to four fibers.

4. The USB connector as recited in claim 1, wherein the insulative base comprises a male connector, and wherein the first surface comprises a top surface of the male connector and wherein the second surface comprises a leading edge surface of the male connector.

5. The USB connector as recited in claim 1, wherein the insulative base comprises a female connector, and wherein the first surface comprises a bottom surface of the female connector and wherein the second surface comprises a back edge surface of the female connector.

6. The USB connector as recited in claim 1, wherein the multiple lenses comprise a transmit lens to expand the beam for transmission and a receive lens to collimate and focus the beam for reception.

7. The USB connector as recited in claim 6, wherein the multiple lenses comprise four embedded lenses, two transmit lenses and two receive lenses.

8. The USB connector as recited in claim 1, wherein the insulative base comprises a base having a USB "A" form factor.

9. The USB connector as recited in claim 1, further comprising V-grooves in the insulative base to passively align the optical fibers with the multiple lenses.

10. A method of providing optical function to a USB connector, comprising:
    providing an insulative base having a first surface and a second surface different from the first surface;
    positioning a plurality of pins on the first surface of the insulative base to make electrical connections, including pins to provide a power connection and at least one pin to provide an electrical data connection; and
    embedding multiple lenses in the second surface of the insulative base to convey an optical data signal beam with the mating USB connector, including expanding a beam from an optical fiber optically coupled to a lens for transmission to the mating USB connector, and collimating and focusing a beam into an optical fiber optically coupled to a lens for reception from the mating USB connector.

11. The method as recited in claim 10 further comprising:
    at least one of the multiple lenses expanding a beam emerging from a fiber to approximately 1 mm.

12. The method as recited in claim 10, wherein the multiple lenses comprise four embedded lenses each respectively optically coupled to four fibers.

13. The method as recited in claim 10, wherein the insulative base comprises a male connector, and wherein the first surface comprises a top surface of the male connector and wherein the second surface comprises a leading edge surface of the male connector.

14. The method as recited in claim 10, wherein the insulative base comprises a female connector, and wherein the first surface comprises a bottom surface of the female connector and wherein the second surface comprises a back edge surface of the female connector.

15. The method as recited in claim 10, wherein the multiple lenses comprise a transmit lens and a receive lens, and further comprising:
   the transmit lens expanding the beam for transmission; and
   the receive lens collimating and focusing the beam for reception.

16. The method as recited in claim 15, wherein the multiple lenses comprise four embedded lenses, two transmit lenses and two receive lenses.

17. The method as recited in claim 10, wherein the insulative base comprises a base having a USB "A" form factor.

18. The method as recited in claim 10, further comprising:
   aligning optical fibers with the multiple lenses via V-grooves in the insulative base.

\* \* \* \* \*